July 22, 1958 F. W. BUHRKE 2,844,077
BOX FORMING MACHINE
Filed June 27, 1956 7 Sheets-Sheet 1

INVENTOR:
FRED W. BUHRKE
BY
Rummler, Rummler & Snow
ATT'YS

July 22, 1958  F. W. BUHRKE  2,844,077
BOX FORMING MACHINE
Filed June 27, 1956  7 Sheets-Sheet 2

FIG. 7

INVENTOR:
FRED W. BUHRKE
BY
ATT'YS

July 22, 1958 F. W. BUHRKE 2,844,077
BOX FORMING MACHINE
Filed June 27, 1956 7 Sheets-Sheet 4

INVENTOR:
FRED W. BUHRKE
BY
ATT'YS

INVENTOR:
FRED W. BUHRKE
ATT'YS

July 22, 1958　　　F. W. BUHRKE　　　2,844,077
BOX FORMING MACHINE

Filed June 27, 1956　　　　　　　　　7 Sheets-Sheet 6

INVENTOR:
FRED W. BUHRKE
BY
ATT'YS

July 22, 1958

F. W. BUHRKE

2,844,077

BOX FORMING MACHINE

Filed June 27, 1956

INVENTOR:
FRED W. BUHRKE
BY
ATT'YS

United States Patent Office 2,844,077
Patented July 22, 1958

2,844,077

BOX FORMING MACHINE

Fred W. Buhrke, Mount Prospect, Ill., assignor to Fraser Label Company, a copartnership Application June 27, 1956, Serial No. 594,226

11 Claims. (Cl. 93—51)

This invention relates to machines for folding plain, flat blanks to form open-top boxes.

The main objects of this invention are to provide an improved machine for expeditiously forming open-top boxes from plain, flat blanks of material; to provide an improved machine of this kind especially adapted to form boxes from metal foil; to provide an improved box-forming machine of this kind which clamps the blank in place and thereby determines the dimension of the base part and then successively obliques the border portions in the base part, folds the corners, completes the fold of the border portions normal to the base part, and finally heat seals the overlapping border portions to retain the box in its folded use form; and to provide an improved box-forming machine of this kind which is comparatively simple and compact in construction and positive and facile in operation.

In the adaptation shown in the accompanying drawings;

Figures 1 to 6 are schematic views showing the several sets of dies and their sequence of operation to convert a blank into a finished box, which views respectively indicate, Fig. 1 the blank about to be clamped in position, Fig. 2 the blank clamped in place and the upper set of obliquing dies moved into position relative to the blank, Fig. 3 the lower set of obliquing dies receded from the border-obliquing operation and a pair of diagonally-opposed dies folding in the corners of the obliqued border portions;

Fig. 3a, a perspective of the blank following this stage of formation,

Fig. 4, the opposed pairs of dies ready to move in toward the obliqued border portions and dispose them normal to the base part held between the clamping dies, Fig. 4a, a perspective of the partially-formed box after the side pair of latter dies have normalized the side border portions, Fig. 5, a view similar to Fig. 4 but with the border-normalizing dies completing the formation of the box, Fig. 5a, a perspective of a completely-formed box, and Fig. 6, the clamping dies retracted and the completed box stripped therefrom;

The essential concept of this invention involves a pair of relatively reciprocating clamping dies and a series of complementary reciprocable dies for initially obliquing border portions of the blank to the base, folding in the corners of the border portions, disposing the border portions normal to the base part, and finally heat sealing the overlapping portions to insure retention of the folded box form.

A box-forming machine embodying the foregoing concept comprises a pair of blank-clamping dies 21 and 22, pairs of complementary reciprocable border-obliquing dies 23 and 24, reciprocable corner-forming dies 25, pairs of border-normalizing dies 26 and 27, and border-sealing means 28, all mounted on a supporting frame F for operation by a cam mechanism 30.

The detail form and functioning of this improved box-forming machine will be understood most readily by explanation first of the schematic views Figs. 1 to 6, which illustrate the step by step procedure from the positioning of the blank to the stripping off of the finished box.

Figure 1:
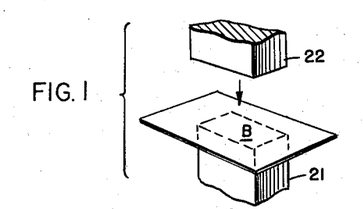
Figures 2, 3, 3A, 4, 4A:
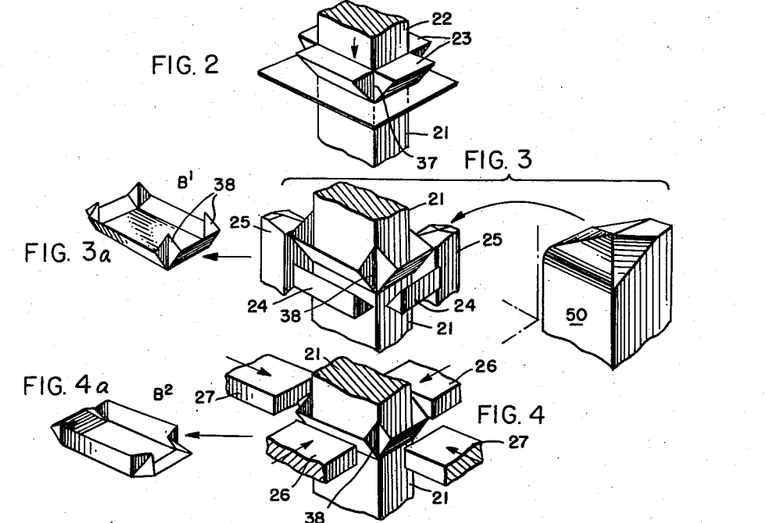

These steps are as follows:

Step 1.—Clamp the blank B between the dies 21 and 22, with the border portions extending outwardly from the perimeters of the dies 21 and 22, Step 2.—Move the upper obliquing dies 23 down into position against blank B, Step 3.—Move the lower obliquing dies 24 into coaction with the upper obliquing dies 23 to effect an obliquing of the border portions of the blank B as shown in Fig. 3a, Step 4.—Move the corner-forming dies 25 into position between the ends of the obliquing dies 23 and 24 to partially fold in the corners of the border portions, as also shown in Fig. 3a, Step 5.—Retract the border-obliquing and corner-forming dies 23, 24, and 25, and then move in the side corner-normalizing dies 26 against the obliqued border portions to press them up against the clamping dies 21 and 22, normal to the base part of the blank B, as shown in Fig. 4a, and then move in the end border-normalizing dies 27 to press the obliqued end border portions up against the clamping dies 21 and 22 normal to the base part of the blank B.

Step 6.—Apply electrical current through means 28 to seal overlapping ends of the border portions.

*Step 7.*—Retract the side and end normalizing dies 26 and 27, and finally,

*Step 8.*—Separate the clamping dies 21 and 22 and dislodge the completed box.

In the adaptation shown herein, the frame F, whereon all of these dies, and the cam mechanism 30, are arranged, comprises a base 31, standards 32 and supporting elements 33 and 34.

The standards 32 are secured in spaced relationship on the base 31 and at their upper ends are spanned by the die-supporting element 33 below which is arranged a reinforcing strut 36. The supporting element 34 is reciprocably suspended above the supporting element 33 on diagonally-positioned telescoping posts 37 (see Figs. 7, 8, 9, and 14).

The blank-clamping dies 21 and 22 are rectangular in form and are centrally secured to the supporting elements 33 and 34, respectively, in vertical axial opposition. The size of these dies, of course, will be determined by the dimensions desired for the finished boxes B3.

Figure 16:
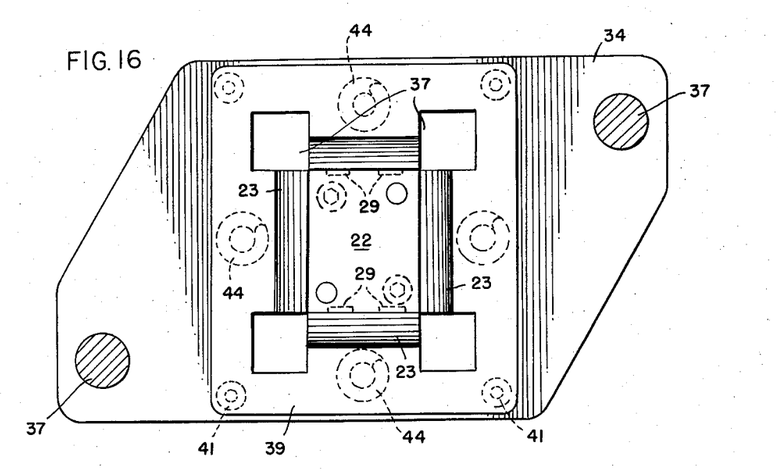
Fig. 16 is an inverted plan view of the upper blank-clamping and border-obliquing die assembly taken on the plane of the line 16—16 of Fig. 9.
Figure 17:
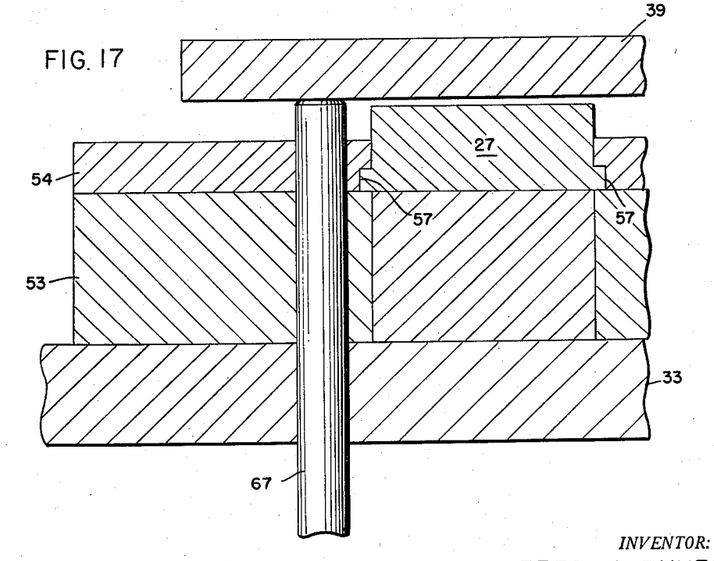
Fig. 17 is a still further enlarged, fragmentary, sectional elevation of parts of the machine as viewed from the plane of the line 17—17 of Fig. 14.

The pairs of side and end-forming border-obliquing dies 23 and 24 are embracively arranged about the clamping dies 21 and 22 respectively. The dies 23 and 24 are reciprocated toward and away from each other to contact opposite faces of the border portions of the blank B, held between the clamping dies 21 and 22, and oblique such border portions to the base part of the blank B, as shown in Figs. 3 and 3a. The dies 23 and 24 are of triangular prismatic form with the opposed blank-contacting faces inclined at about 45 degrees to the axis of the clamping dies 21 and 22. In length, these opposed pairs of dies 23 and 24 here shown are equal to the corresponding dimensions of the clamping dies 21 and 22. Thus, as most clearly shown in Figs. 2, 3, 14 and 16, these dies 23 and 24 have right-angularly disposed triangularly-shaped ends forming spaces 37 (see Figs. 2 and 16) at the four corners of the clamping dies 21 and 22 and into which spaces 37 the corner dies 25 move to partially fold in the corners 38 (see Figs. 3, 3a, 4 and 4a) of the obliqued border portions.

Figure 15:
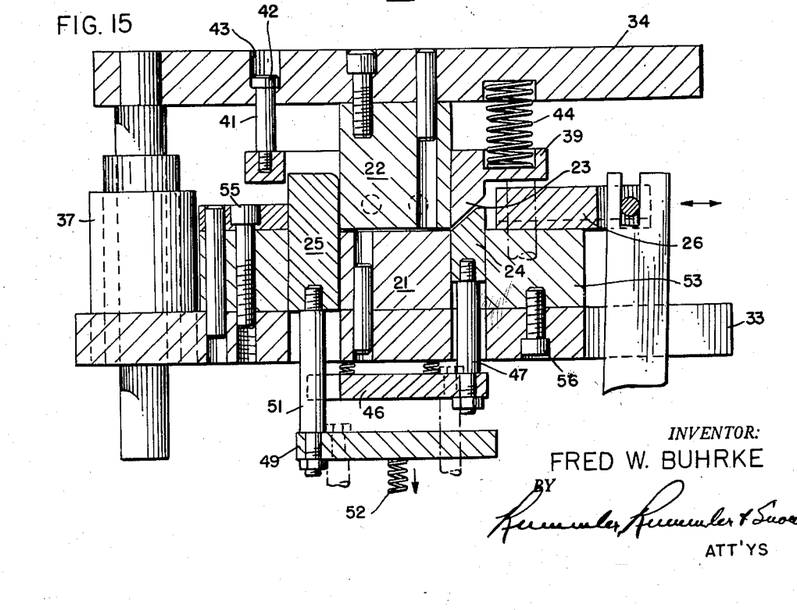
Fig. 15 is an irregular, vertical, sectional elevation of the upper portion of the machine shown in Fig. 9, as viewed from the plane of the line 15—15 of that figure.

The upper border-obliquing dies 23 are either integral with or appropriately bonded to a supporting plate 39 which embraces the blank-clamping die 22. This plate is suspended from the supporting element 34 by pins 41 the heads 42 of which are slidable in apertures 43. (See Fig. 15.) These heads, thus, limit the movement of the plate 39 away from the element 34 caused by the spacing springs 44, all of which will be explained more fully hereinafter.

The lower border-obliquing dies 24 are connected to a plate 46 by pins 47 slidably supported in the supporting element 33. (See Figs. 9, 12 and 18.) This plate 46 normally is urged by springs 48, interposed between the element 33 and the plate 46, to retract the dies 24 to seat against the upper face of the supporting element 33.

Figure 5:
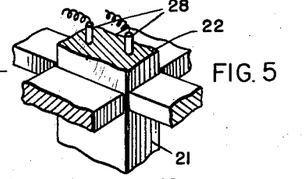
Figure 14:
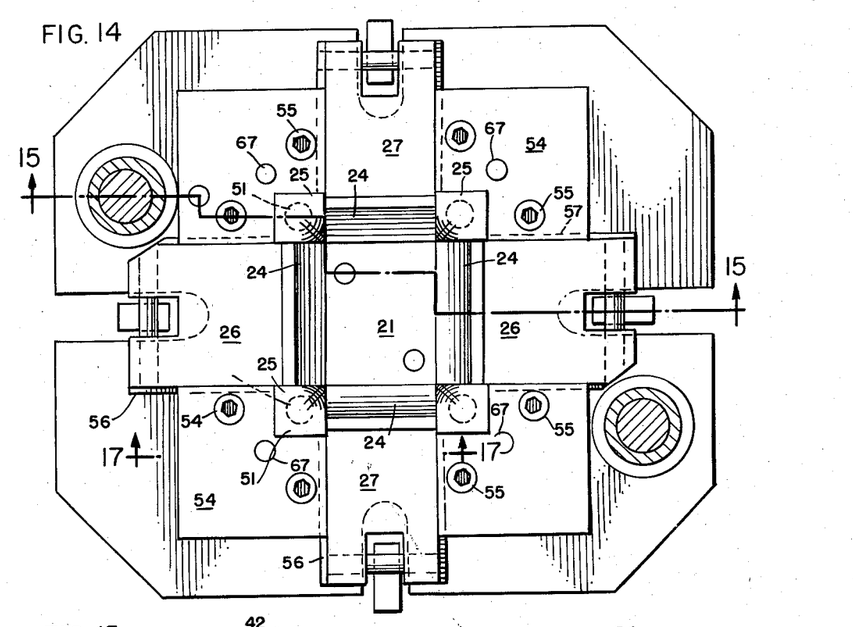
Fig. 14 is a transverse plan view of the machine, shown in Fig. 9, taken on the plane of the line 14—14 of that figure.
Figure 19:
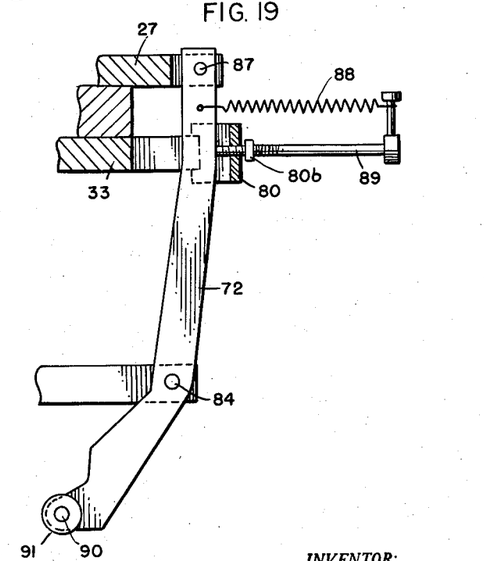
Fig. 19 is a fragmentary, detail taken on the line 19—19 of Fig. 9.

The corner-forming dies 25, as most clearly shown in Figs. 5 and 14, are formed with right-angularly disposed faces 50 and are vertically slidable on the support element 33 into the spaces 37 between the ends of the respective lower border-obliquing dies 24. These corner-forming dies 25 are connected to an actuating plate 49 (see Figs. 15 and 19) by pins 51 and normally urged by springs 52 into their retracted positions with their upper ends below the plane of the upper end of the lower clamping die 21.

The border-normalizing dies 26 and 27 are arranged in opposed pairs—side and end—and reciprocably slidable between blocks 53 and plates 54 secured together in superimposed relationship by bolts 55. The blocks 53 are secured to the supporting element 33 by bolts 56 (see Figs. 14 and 15). The reciprocable sliding of these dies 26 and 27 is provided for by flanges 57 extending oppositely outwardly along the lower lateral edges into guideways along the opposed lower edges of the plates 54 (see Figs. 8, 9, 14 and 17).

Figure 5A:
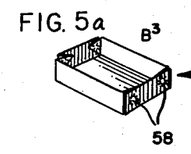
Figure 20:
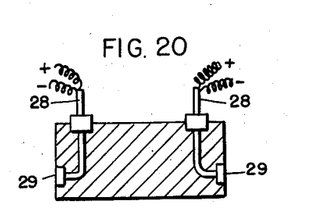
Fig. 20 is an enlarged, fragmentary detail of the heat-sealing structure in the shiftable blank-clamping die.

The border-sealing means 28, diagrammatically illustrated in Figs. 5 and 20, comprises the conventional Calrods set in the upper blank-clamping die 22 and connected to a source of current so that the normalizing of the border portions of the blank B having been completed, there is an instantaneous charge of electricity delivered to the disks 29 so as to heat seal the overlapping portions of the spots indicated at 58 in Fig. 5a.

Figure 7:
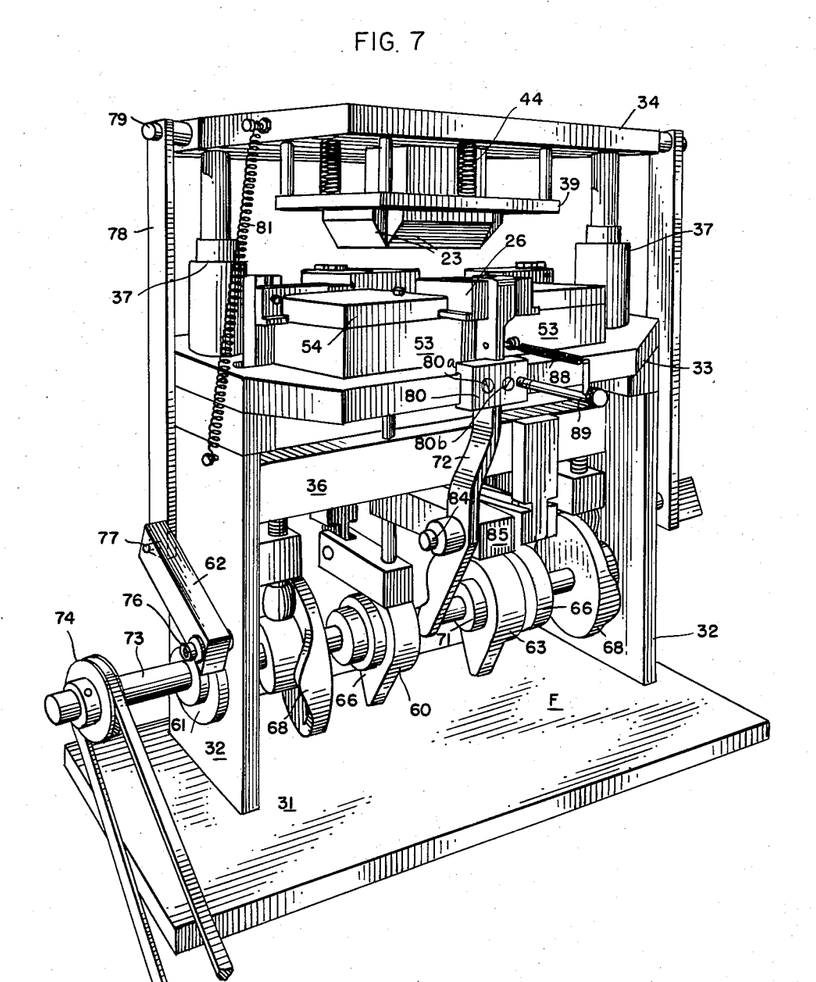
Fig. 7 is a perspective view of a box-forming machine constructed in accordance with this invention.
Figures 8, 9:
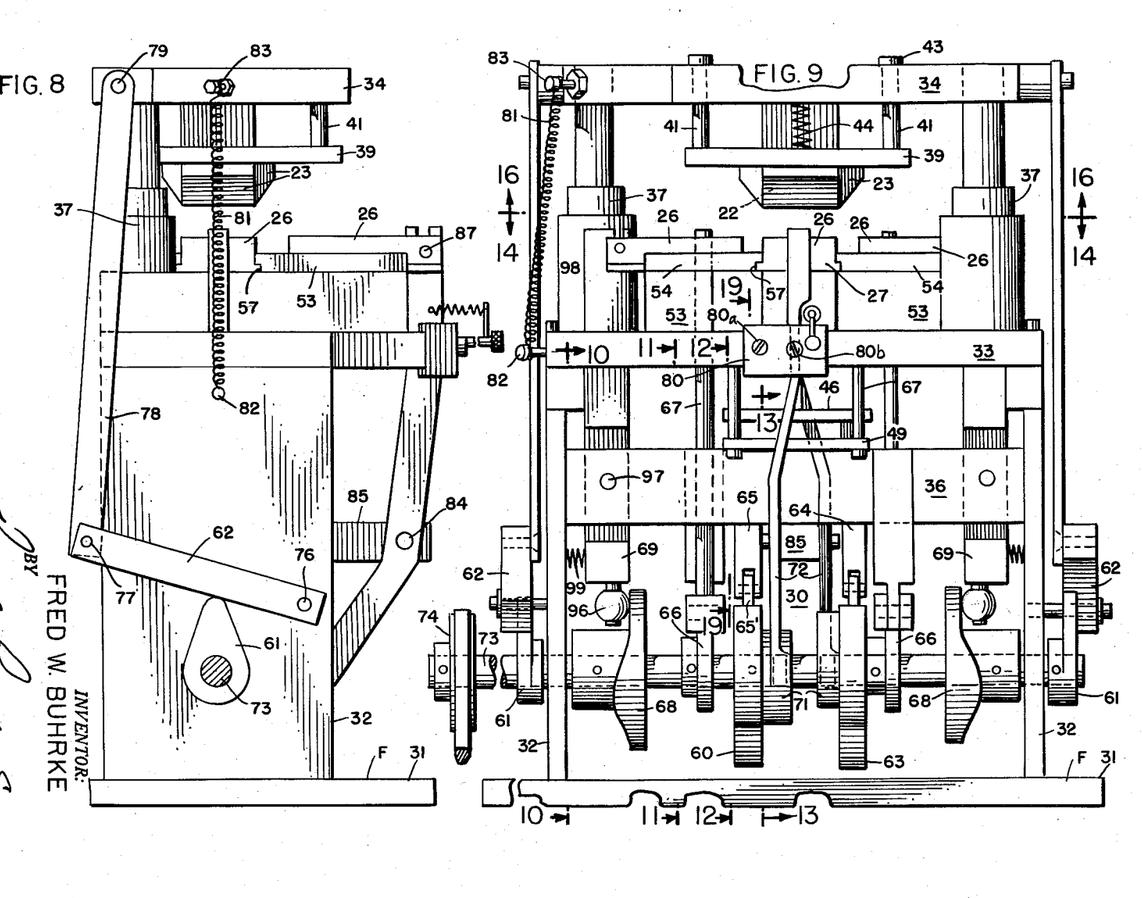
Fig. 8 is an end elevation of the machine shown in Fig. 7.
Fig. 9 is a front elevation of the same.
Figure 10:
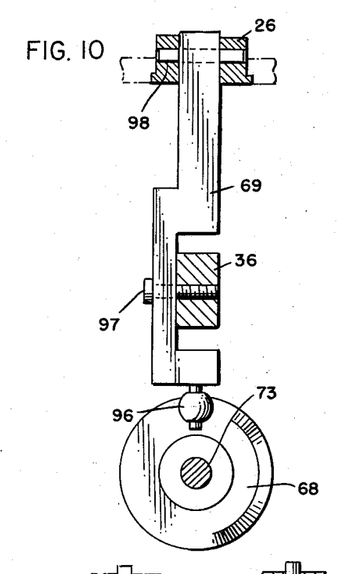
Fig. 10 is an enlarged, fragmentary detail of the cam-actuated mechanism which shifts the dies for normalizing the side border portions of the blank, the view being taken on the plane of the line 10—10 of Fig. 9.

The cam mechanism 30 which effects the sequential functioning of the foregoing dies is most clearly shown in Figs. 7 and 9. This mechanism comprises, (*a*) a pair of cams 61, actuating rocker arms 62 for reciprocating the upper clamping die 22 and the upper border-obliquing dies 23, (*b*) a pair of cams 60 and 63 respectively actuating plungers 64 and 65 for reciprocating the lower border-obliquing dies 24 and the corner-forming dies 25, (*c*) a pair of cams 66 for actuating rods 67 for retracting the upper border-obliquing dies 23, (*d*) a pair of cams 68 for actuating rocker arms 69 for reciprocating the side border-normalizing dies 26 and 27, and (*e*) cams 71 actuating the rocker arms 72 for reciprocating the end border-normalizing dies 27. All of these pairs of dies 60, 61, 63, 66, 68 and 71 are fixed on a drive shaft 73 journaled on the frame standards 32 adjacent the base 31 and to which shaft 73 is connected a suitable drive means such as the hereinshown belt-driven pulley 74.

The cams 61 are secured to the shaft 73 outwardly adjacent the standard 32. The coacting rocker arms 62 each has one end hinged at 76 to the respective standards 32 and the other end hinged at 77 to a link 78. The links 78 are hinged at their upper ends at 79 to the upper support element 34. A pair of springs 81, spanning pins 82 and 83, on the standard 32 and element 34 respectively, normally urge the element 34 downwardly and hold the rocker arms 62 in constant contact with their respective cams 61.

The cams 60 and 63 here are shown as integral with the cams 71 and are positioned on the shaft 73 nearly medially between the standard 32 with the cams 71 opposed. The plungers 64 and 65 actuated by the respective cams 60 and 63, are slidably supported in the frame strut 36 and connected to the plates 46 and 49 which mount the pins 47 and 51 connected to the lower border-obliquing dies 24 and to the corner-forming dies 25, respectively. The springs 48 and 52 normally depress the respective plates 46 and 49 to hold the plunger rollers 64' and 65' against the respective cams 60 and 63. (See Figs. 12 and 18.)

Figures 12, 13:
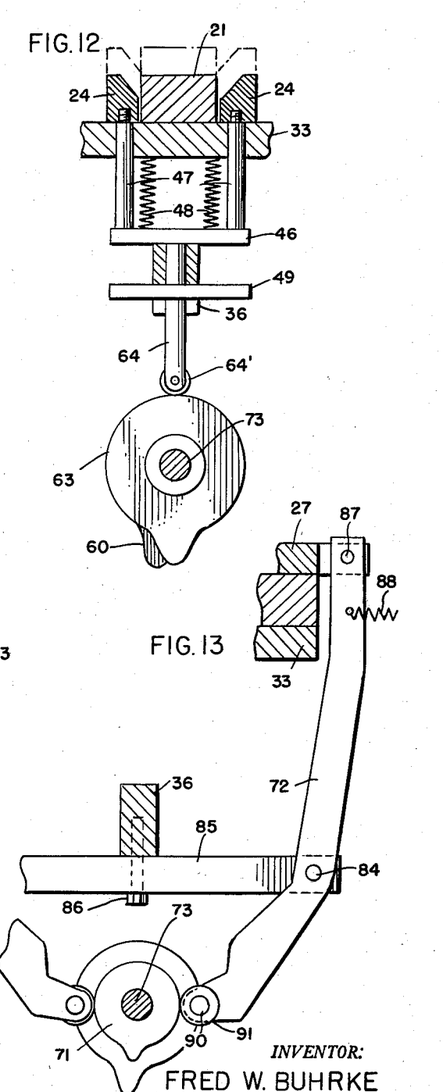
Fig. 12 is an enlarged, fragmentary detail of the cam mechanism which effects the opposite reciprocation of the lower border-obliquing dies, the view being taken on the plane of the line 12—12 of Fig. 9.
Fig. 13 is an enlarged, fragmentary detail of the cam mechanism which shifts the dies for normalizing the end border portions, the view being taken on the plane of the line 13—13 of Fig. 9.

The rocker arms 72, actuated by the cams 71, are hinged at 84 at opposite ends of a transversely-disposed cross bar 85 secured to the strut 36 by a bolt 86 (see Fig. 13). Above the hinge pivots 84, the rocker arms 72 extend through slots in the support element 33 at which point the rocker arms 72 are embraced by blocks 80, the function of which will be pointed out presently. At their upper ends the rocker arms 72 are hinged at 87 to the slotted ends of the respective end border-obliquing dies 27. Springs 88 spanning pins 89 and 90, on the block 80 and the upper ends of the respective rocker arms 72, normally dispose the rocker arms 72 to hold the respective rollers 90, on the lower ends of the rocker arms, against the cams 71.

A block 80 is secured, by a holding screw 80a, to the support element 33 to embrace each rocker arm 72 near its upper end (see Figs. 7, 8, 9 and 19). Each such block 80 mounts an adjusting screw 80b (see Fig. 19) which limits the retraction of the respective rocker arm 72 by its spring 88.

Figure 11:
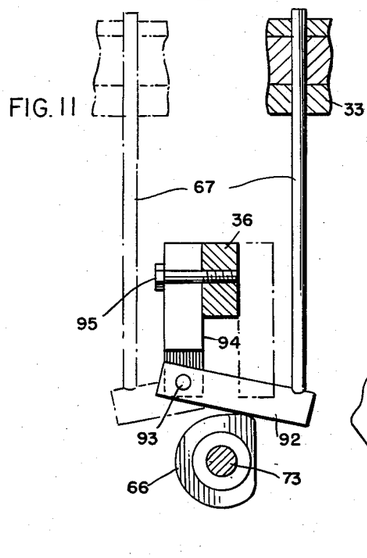
Fig. 11 is an enlarged, fragmentary detail of the cam mechanism which retracts the upper set of border-obliquing dies, the view being taken on the plane of the line 11—11 of Fig. 9.

The cams 66 are secured to the shaft 73 axially outwardly on opposite sides of the respective cams 60—63. Pairs of rocker arms 92 are hinged at 93 to the respective posts 94 and interposed between the respective cams 66 and the lower ends of the rods 67 (see Fig. 11). The posts 94 are secured to opposite sides of the cross strut 36 by bolts 95.

The pairs of cams 68 are secured adjacent the opposite ends of the shaft 73 directly inwardly of the frame standards 32. These are drum type cams, against the faces of which ride rollers 96 on the lower ends of the respective rocker arms 69. The rocker arms 69 are hinged at 97 to the cross strut 36 and at their upper ends are hinged at 98 in slots in the outer ends of the respective side border-normalizing dies 26. Springs 99 (see Fig. 9) interposed between the lower ends of these rocker arms 69 and the respective frame standards 32 dispose the rocker arms 69 to hold the rollers 96 in contact with the respective cams 68.

The operation of this improved box-forming machine is as follows:

Assuming a constant operation of the shaft 73, blanks B are intermittently positioned on the lower and stationary clamping die 21. This may be done either manually or by automation. Obviously, such positioning of the blanks B is effected as soon as possible after the high point on the cams 61 have elevated the support element 34 sufficiently to permit such placing of a blank B on the stationary die 21.

As the high points of the cams 61 recede from the rocker arms 62, the springs 81 pull the support element 34 downwardly to bring the upper clamping die 22 to grip and hold the blank B between the dies 21 and 22. At the same time the upper border-obliquing dies 23 are moved into position against the upper face of the blank B held between the dies 21 and 22. (See Fig. 2.)

Figure 18:
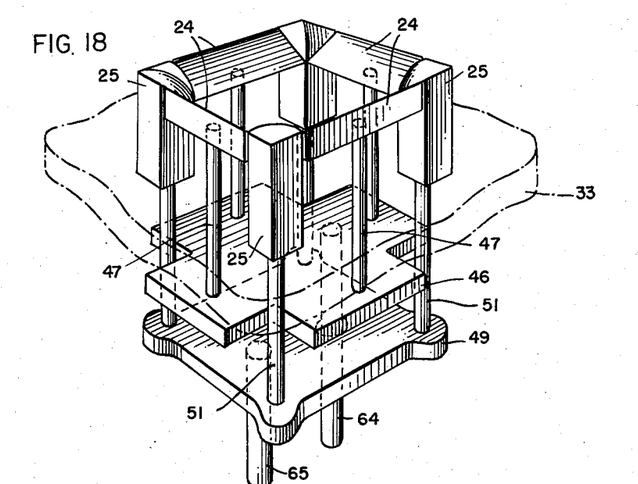
Fig. 18 is a fragmentary, perspective of the lower border-obliquing and corner-forming dies and their cam-actuated operating mechanisms.

As the clamping die 21 and border-obliquing dies 23 approach the limit of their downward movement, the high points of the cams 60 and 63, in quick succession, elevate the lower border-obliquing dies 24 and the corner-forming dies 25 (see Figs. 3, 12 and 18). Such a partially-formed box B1 is shown in Fig. 3a.

As soon as the borders have been obliqued and the corners folded in, the high points of the cams 60 and 63 pass their contact with the rollers 64' and 65' on the plungers 64 and 65 to permit the springs 48 and 52 to retract the dies 24 and 25. Simultaneously the high points of the cams 66 rock the respective arms 92 to shift the rods 67 upwardly to cause the upper ends to engage the plate 39 (see Fig. 15) and retract the upper border-obliquing dies 23 against the springs 44 thereby permitting the subsequent action of the border-normalizing dies 26 and 27.

While the cams 66 hold the upper-border-obliquing dies 23 retracted against the springs 44, the high points of the cams 68 and 71 actuate the respective rocker arms 69 and 72 to slide the pairs of dies 26 and 27, in quick succession, into contact with the obliqued border portions and press them up against the faces of the clamping dies 21 and 22 and thereby dispose these sides and ends normal to the base part of the blank B held between the clamping dies 21 and 22. As these normalizing pairs of dies 26 and 27 press in the obliqued border portions, the partially folded-in corners also are pressed further inwardly and downwardly to bring their upper edges flush with the upper edges of the normalized sides, as clearly shown in Figs. 5 and 5a.

A partially-formed box B2 with the sides normalized but the ends still oblique is shown in Fig. 4a.

With the pairs of dies 26 and 27 holding the normalized borders of the blank B in contact with the clamping dies 21 and 22, an instantaneous charge of electrical current is delivered through the Calrods 28 to the disks 29 so that the overlapping ends of the border portions are heat sealed at spots as indicated at 58 in Fig. 5a.

The heat-sealing operation being effected, the high points of the cams 68 and 71 recede from the respective rocker arms 69 and 72 and allow the springs 99 and 88 to retract the respective pairs of dies 26 and 27 and 23.

Meanwhile the other parts of the cam mechanism 30 have restored all parts of the machine to their respective initial positions preparatory to having the above-described cycle of operations repeated.

Figure 6:
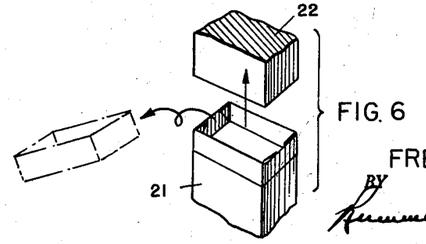

As the cams 61 elevate the support element 34 and retract the clamping die 22, the finished box B3 of Fig. 5a is dislodged from the die 21, as shown in Fig. 6, either manually or by automation.

It is to be understood that details shown may be altered or omitted without departing from the spirit of this invention as defined by the following claims.

I claim:

1. A box-forming machine comprising, means for clamping a blank at a fixed horizontal position with free border portions of the blank extending outwardly of the perimeter of the clamping means, a plurality of sets of complementary dies respectively shiftable relative to the clamping means for successively obliquing the border portions of the blank to the base part held in the clamping means, folding in the corners of the border portions, and finally disposing the obliqued border portions normal to the base part, and mechanism for effecting the successive operation of the clamping means and the plurality of dies.

2. A box-forming machine comprising, means for clamping a blank at a fixed horizontal position with free border portions of the blank extending outwardly of the perimeter of the clamping means, dies shiftable relative to each other and to the clamping means to oblique the border portions of the blank to the base part held in the clamping means, other dies shiftable relative to the clamping means to fold in the corners of the border portions of the blank, third dies shiftable relative to the clamping means for disposing the oblique border portions of the blank normal to the base part, and mechanism for effecting the sequential operation of the clamping means and the respective dies.

3. A box-forming machine comprising, means for clamping a blank at a fixed horizontal position with free border portions of the blank extending outwardly of the perimeter of the clamping means, dies shiftable relative to the clamping means to oblique the border portions of the blank to the base part held in the clamping means, other dies shiftable relative to the clamping means to fold in the corners of the border portions of the blank, third dies shiftable relative to the clamping means for disposing the oblique border portions of the blank normal to the base part, mechanism for effecting the sequential operation of the clamping means and the respective dies, and means for sealing overlapping border portions of the clamp-held blank.

4. A box-forming machine comprising, a pair of blank clamping dies shiftable relatively of each other to clamp the blank in fixed horizontal position with free border portions of the blank extending outwardly of the perimeter of the clamping means, a pair of complementary dies axially reciprocable of the blank clamping dies for obliquing border portions of the base part of the blank held between the clamping dies, corner dies reciprocable relative to the blank-clamping dies to fold in the corners of the border portions of the blank, other dies shiftable relatively of the blank-clamping dies for disposing the border portions of the blank normal to the base part, and operating means for effecting the sequential operation of the respective dies.

5. A box-forming machine comprising, a pair of axially shiftable rectangular-shaped blank-clamping dies, a pair of complementary triangular prismatic dies axially reciprocable of the blank-clamping dies for obliquing border portions of the base part of the blank held between the clamping dies, corner dies reciprocale relative to the blank-clamping dies into the space between the obliquing die ends to fold in the corners of the border portions of the blank, other dies shiftable relatively of the blank-clamping dies for disposing the border portions of the blank normal to the base part, and operating means for effecting the sequential operation of the respective dies.

6. A box-forming machine comprising, a pair of axially shiftable rectangular-shaped blank-clamping dies, a pair of complementary triangular prismatic dies axially reciprocable of the blank-clamping dies for obliquing border portions of the base part of the blank held between the clamping dies, corner dies reciprocable relative to the blank-clamping dies into the space between the obliquing dies ends to fold in the corners of the border portions of the blank, other dies shiftable relatively of the blank-clamping dies for disposing the border portions of the blank normal to the base part, operating means for effecting the sequential operation of the respective dies, and means for sealing overlapping border portions of the clamp-held blank.

7. A box-forming machine comprising, a pair of rectangular-shaped blank-clamping dies, a pair of complementary triangular prismatic dies axially shiftable along the respective faces of the rectangular clamping dies for obliquing the border portions of the blank to the base part held between the clamping dies, corner dies reciprocable relative to the blank-clamping dies into the space between the obliquing die ends to fold in the corners of the blank, other dies shiftable radially of the blank-clamping dies for disposing the border portions of the blank normal to the base part, and operating means for effecting the sequential operation of the respective dies.

8. A box-forming machine comprising, a pair of opposed supporting elements, a pair of blank-clamping dies oppositely positioned on the respective elements and movable into and out of position to clamp a blank between them, complementary dies embracing the respective clamping dies and being relatively shiftable axially of the clamping dies into and out of position to oblique border positions of the blank relative to the base part held between the clamping dies, corner-forming dies shiftable into and out of position to fold in the corners of the border portions of the blank, pairs of other dies movable toward and away from each other transversely adjacent the clamping dies to dispose the oblique border portions normal to the base part of the blank, and means for effecting the sequential operation of the respective dies.

9. A box-forming machine comprising, a pair of opposed supporting elements, a pair of rectangular-shaped blank-clamping dies oppositely positioned on the respective elements and movable into and out of position to clamp a blank between them, complementary dies having parallel opposed faces oblique to the plane of the clamped blank, the dies embracing the respective clamping dies and being relatively shiftable axially of the clamping dies into and out of position to oblique border positions of the blank relative to the base part held between the clamping dies, corner-forming dies shiftable into and out of position to fold in the corners of the border portions of the blank, pairs of other dies movable toward and away from each other transversely adjacent the clamping dies to dispose the oblique border portions normal to the base part of the blank, and means for effecting the sequential operation of the respective dies.

10. A box-forming machine comprising, a pair of supporting elements, a pair of rectangular-shaped clamping dies oppositely arranged on the respective elements and movable into and out of position to clamp a blank between them, complementary dies having parallel opposed faces oblique to the plane of the clamped blank, the dies embracing the respective clamping dies for axial movement relative thereto, the ends of each die section terminating at the respective corners of the clamping dies thereby forming spaces between the right-angularly-disposed ends of the adjacent die sections, the dies being shiftable into and out of position to oblique the border parts of the blank held between the clamping dies, corner-forming dies having right-angularly-disposed faces shiftable relative to the corners of the respective clamping dies into the space between the obliquing die ends for folding in the corners of the border portions of the blank, pairs of other dies movable toward and away from each other transversely adjacent the clamping dies to dispose the oblique border portions normal to the base part of the blank, and means for effecting the sequential operation of the respective dies.

11. A box-forming machine comprising, a pair of supporting elements, a pair of rectangular-shaped clamping dies oppositely arranged on the respective elements and movable into and out of position to clamp a blank between them, complementary dies having parallel opposed faces oblique to the plane of the clamped blank, the dies embracing the respective clamping dies for axial movement relative thereto, the ends of each die section terminating at the respective corners of the clamping dies thereby forming spaces between the right-angularly-disposed ends of the adjacent die sections, the dies being shiftable into and out of position to oblique the border parts of the blank held between the clamping dies, corner-forming dies having right-angularly-disposed faces shiftable relative to the corners of the respective clamping dies into the space between the obliquing die ends for folding in the corners of the border portions of the blank, pairs of other dies movable toward and away from each other transversely adjacent the clamping dies to dispose the oblique border portions normal to the base part of the blank, means for effecting the sequential operation of the respective dies, and means associated with the clamping dies for sealing overlapping border portions of blank.

References Cited in the file of this patent

UNITED STATES PATENTS 1,908,823    Daniell _______________ May 16, 1933